United States Patent
Cronch et al.

(10) Patent No.: US 6,954,278 B1
(45) Date of Patent: Oct. 11, 2005

(54) DYNAMIC PRINTER OPERATING SYSTEM

(75) Inventors: Darell Dean Cronch, Georgetown, KY (US); Thomas Jon Eade, Lexington, KY (US); Mark Joseph Edwards, Lexington, KY (US); Mark Walter Fagan, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 1111 days.

(21) Appl. No.: 09/023,441

(22) Filed: Feb. 13, 1998

(51) Int. Cl.⁷ .............................................. G06F 15/00
(52) U.S. Cl. ........................................ 358/1.15; 358/1.1
(58) Field of Search ................................ 358/1.1, 1.12, 358/1.13, 1.15, 401, 409, 442, 443, 445, 448, 500, 501; 714/7; 709/200, 201, 213, 214, 219, 104; 710/104, 105, 8, 65; 712/209; 713/2, 100; 382/276, 277; 399/85; 395/101, 111, 112, 114, 182.05, 200.3, 200.51, 200.52, 200.59, 200.72, 284, 285, 385, 500, 527, 674, 652, 653, 712, 828, 885, 500.48

(56) References Cited

U.S. PATENT DOCUMENTS

| | | | |
|---|---|---|---|
| 4,742,483 A | 5/1988 | Morrell | 364/900 |
| 4,926,347 A | 5/1990 | Uchida et al. | 364/519 |
| 5,050,098 A | 9/1991 | Brown, III et al. | 364/519 |
| 5,142,680 A | 8/1992 | Ottman et al. | 395/700 |
| 5,146,568 A | 9/1992 | Flaherty et al. | 395/325 |
| 5,197,123 A | 3/1993 | Nagata et al. | 395/148 |
| 5,222,200 A | 6/1993 | Callister et al. | 395/112 |
| 5,228,118 A * | 7/1993 | Sasaki | 358/1.13 |
| 5,239,621 A | 8/1993 | Brown, III et al. | 395/115 |
| 5,280,627 A | 1/1994 | Flaherty et al. | 395/700 |
| 5,293,466 A | 3/1994 | Bringmann | 395/114 |
| 5,303,336 A | 4/1994 | Kageyama et al. | 395/114 |
| 5,332,320 A | 7/1994 | Ohara | 400/76 |
| 5,371,837 A | 12/1994 | Kimber et al. | 395/114 |
| 5,388,920 A | 2/1995 | Ohara | 400/76 |
| 5,410,641 A | 4/1995 | Wakabayashi et al. | 395/112 |
| 5,438,528 A | 8/1995 | Emerson et al. | 364/580 |
| 5,442,541 A | 8/1995 | Hube et al. | 364/138 |
| 5,444,826 A | 8/1995 | Okada | 395/112 |
| 5,445,459 A | 8/1995 | Sasaki | 400/76 |
| 5,467,432 A | 11/1995 | Ota | 395/112 |
| 5,467,435 A | 11/1995 | Douglas et al. | 395/114 |
| 5,495,559 A | 2/1996 | Makino | 395/112 |
| 5,533,174 A | 7/1996 | Flowers, Jr. et al. | 395/114 |
| 5,537,626 A | 7/1996 | Kraslavsky et al. | 395/828 |
| 5,561,744 A | 10/1996 | Sugaya et al. | 395/112 |
| 5,568,594 A | 10/1996 | Suzuki | 395/112 |
| 5,611,046 A | 3/1997 | Russell et al. | 395/200.1 |
| 5,613,160 A | 3/1997 | Kraslavsky et al. | 395/836 |
| 5,666,293 A * | 9/1997 | Metz et al. | 395/200.5 |
| 5,671,341 A * | 9/1997 | Kashiwazaki et al. | 395/112 |
| 5,754,748 A * | 5/1998 | Rivers et al. | 395/116 |
| 5,838,887 A * | 11/1998 | Murakami | 358/1.13 |

* cited by examiner

Primary Examiner—Gabriel Garcia
(74) Attorney, Agent, or Firm—Todd Taylor, Esq.; Ronald K. Aust, Esq.

(57) ABSTRACT

A method of printing on a print medium with a printer which is in communication with a host computer includes the steps of providing the host computer with a print job to be printed by the printer, identifying a data format associated with the print job, determining an operating system stored in the printer, comparing the data format with the printer operating system, downloading an operating system which corresponds to the data format from the host computer to the printer if the printer operating system does not correspond to the data format, transmitting print data associated with the print job from the host computer to the printer, and printing on the print medium with the printer using the print data.

3 Claims, 2 Drawing Sheets

DYNAMIC PRINTER OPERATING SYSTEM

FIELD OF THE INVENTION

The present invention relates to a method of providing a printer with an operating system with which to control a print engine and interpret data sent from a host device.

DESCRIPTION OF THE RELATED ART

An operating system is written to perform a specific function that characterizes the printer. The operating system enables a printer to render a print image on a print medium that corresponds to the print image data sent from the host application software. This data used to represent the print image can take any of several standard forms as well as any proprietary format as developed by the printer manufacturer. Data formats that are standard in the industry allow host application software developers to easily obtain information necessary to output data in these formats. Thus, a printer that recognizes many of these proprietary or standard formats, e.g., PCL, PostScript, PPDS, GL and Impress, is more versatile than one that has been targeted to a specific data format.

It is known in conventional printer systems to utilize various non-volatile memory storage devices to store the Operating System (OS) microcode in the printer. A single printer can store a large number of various operating systems in memory. The host computer identifies to the printer the format in which the print data is being sent. Based upon this data format identification, the printer selects the appropriate operating system from memory with which to interpret the print data. A problem is that a large amount of memory is required to store multiple operating systems within the printer.

It is also known to provide a printer with an EPROM device or a flash memory in which an operating system can be stored. When the data format of the print data to be sent by the host computer is incompatible with the operating system stored in the EPROM or flash memory, the user physically removes the EPROM or flash memory and reprograms it with the appropriate new operating system. A problem is that physical interaction with the printer is required and it is impractical to download printer functions and features from sources such as the internet or bulletin board systems.

Similarly, it is known to provide a printer with cartridges that contain one or more operating systems. The user can replace the cartridges to suit the requirements of the data format of the print data to be sent by the host computer. A problem, again, is that physical interaction is required and downloading files from external sources is impractical.

What is needed in the art is a method of providing a printer with an operating system which requires no physical interaction with the user and a minimum of memory to store the operating system for use with a print job.

SUMMARY OF THE INVENTION

The present invention provides a method of downloading an operating system from a host computer to a printer whenever the operating system resident in the printer is not compatible with the data format of the print data to be sent from the host computer.

The invention comprises, in one form thereof, a method of printing on a print medium with a printer which is in communication with a host computer. The method includes the steps of providing the host computer with a print job to be printed by the printer, identifying a data format associated with the print job, determining an operating system stored in the printer, comparing the data format with the printer operating system, downloading an operating system which corresponds to the data format from the host computer to the printer if the printer operating system does not correspond to the data format, transmitting print data associated with the print job from the host computer to the printer, and printing on the print medium with the printer using the print data.

An advantage of the present invention is that a minimum of memory is required in the printer for the storage of operating systems; also, this memory need not be non-volatile.

Another advantage is that the operating system can be upgraded by the user without any physical interaction with the printer.

Yet another advantage is that a single printer can be used in multiple environments where different printer models are generally required.

BRIEF DESCRIPTION OF THE DRAWINGS

The above-mentioned and other features and advantages of this invention, and the manner of obtaining them, will become more apparent and the invention will be better understood by reference to the following description of embodiments of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

The present invention includes a method of enabling a printer to adapt to any one of a set of different characteristic operating schemes and image data formats without having to store the necessary microcode for all implementations. The printer only stores the operating system being used at the time of printing and can accept a new functional system description with each new print job.

Figure 1:
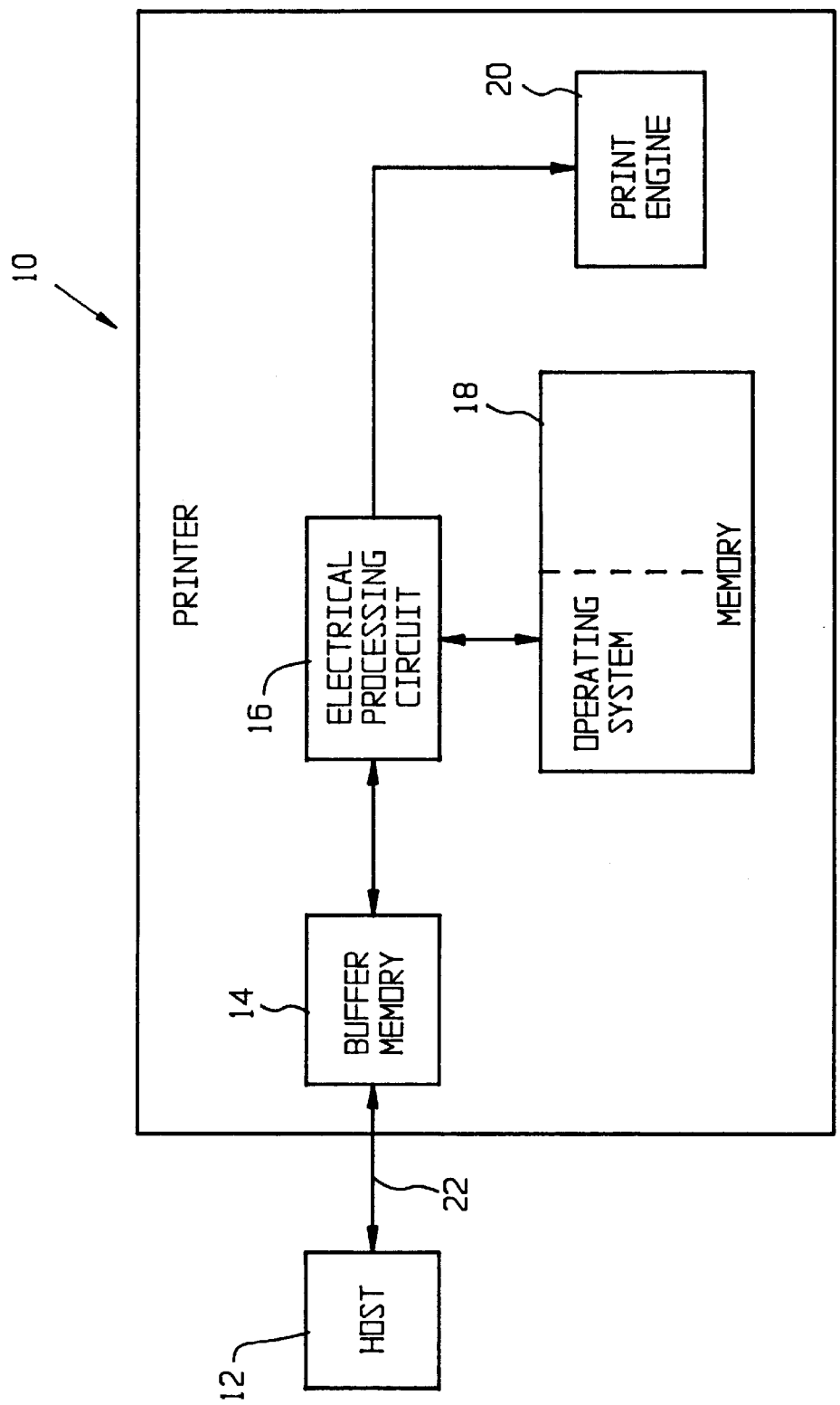
FIG. 1 is a block diagram of a host based printer connected to a host computer showing an embodiment of the data flow of the method of the present invention.

Referring now to the drawings and more particularly to FIG. 1, there is shown a schematic illustration of one embodiment of the present invention including a host based printer 10 connected to a host computer 12.

Printer 10 includes a buffer memory 14, an electrical processing circuit (EPC) 16 which can be, e.g., a microprocessor; a memory device 18 which can include, e.g., a Random Access Memory (RAM) and/or Read Only Memory (ROM); a print engine 20 including, e.g., an electrophotographic assembly or an ink cartridge mounted on a movable carriage assembly; and a communication channel 22 which can be, e.g., a data bus. Wherein this application the term "memory", "memory device" or the like is used, it is to be understood that the term may include multiple memory elements. All data or other information passing between host 12 and electrical processing circuit 16 is directed through buffer memory 14 in the embodiment shown in FIG. 1.

Figure 2:
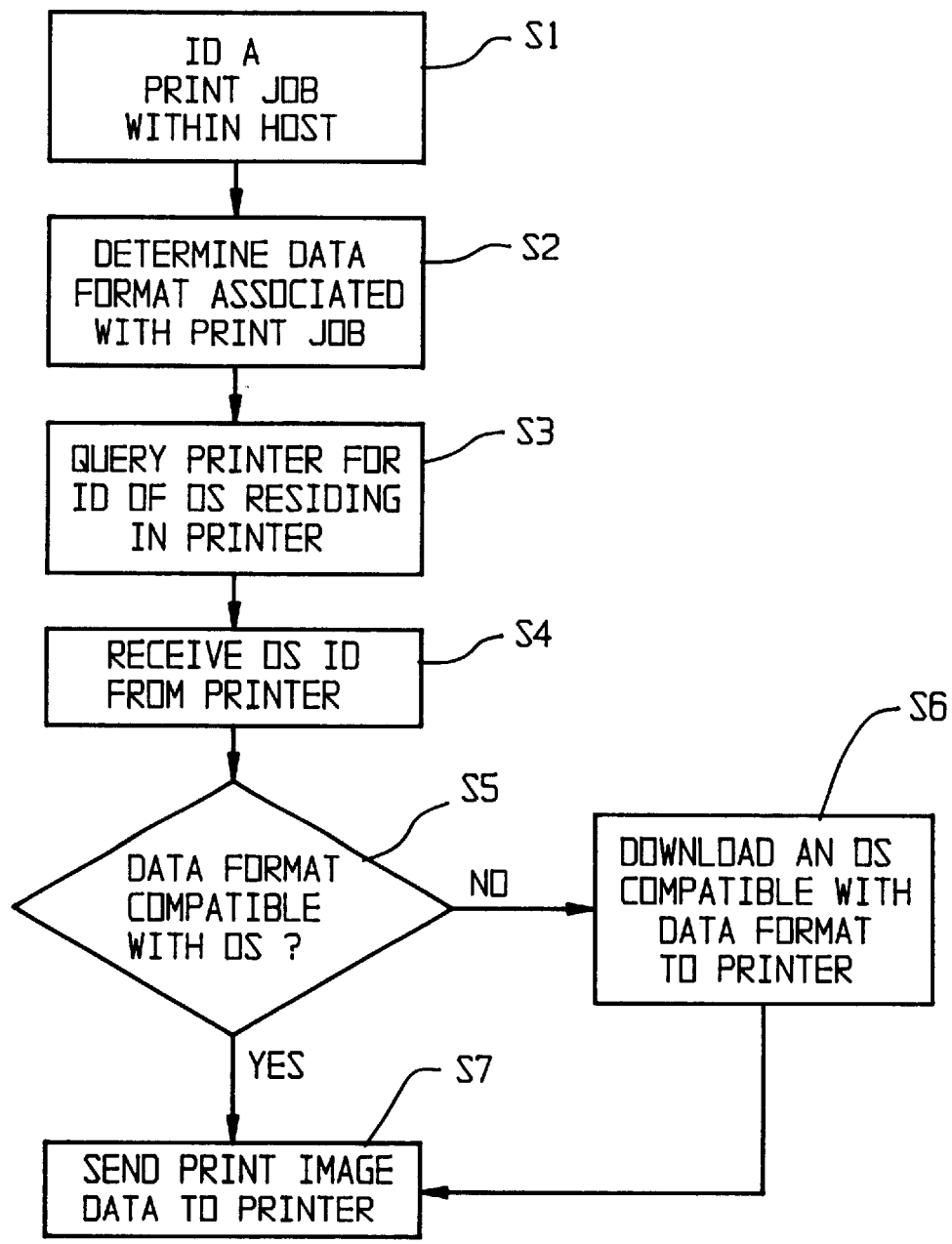
FIG. 2 is a flow chart illustrating one embodiment of the method of the present invention.

Referring now to FIG. 2, there is shown a flow chart illustrating one embodiment of the method of the present invention. In step S1, host computer 12 identifies a print job within itself to be sent to printer 10. In step S2, host 12 determines the data format associated with the print job. Host 12 can receive from an external source (not shown) a print job already compiled in a particular data format. Such data format could be, for example, one of PCL, Postscript, PPDS, GL and Impress data formats. The host computer 12 can then determine the data format by receiving the data format identity from the external source or by analyzing the data to identify the data format being employed. Alternatively, host 12 can internally create a print job in a particular data format. Printer 10 contains in memory 18 a small amount of resident software that is used to establish communications with host 12. Once host computer 12 has recognized printer 10, host 12 can query printer 10 over communication channel 22 to determine the operating system currently loaded in memory 18 (step S3). In step S4, in response to the query, host 12 receives the operating system identification from printer 10. In step S5, host 12 compares the operating system identity received from printer 10 in step S4 with the data format of the print job to be sent to printer 10. If the print job to be printed requires an operating system different from that residing in memory 18 of printer 10, host 12 requests that an appropriate replacement operating system be sent to printer 10 and stored in memory 18 (step S6). All operating systems stored in memory 18 of printer 10 that are different from the operating system required by host computer 12 are erased. The printer operating system is overwritten with the operating system from host computer 12. Thus, the amount of memory required within memory 18 is reduced. If the print job to be printed requires an operating system which is the same as that residing in memory 18, host 12 sends the print image data to printer 10 (step S7). In the embodiment shown, host 12 sends the print image data over the same communication channel 22 as used to download an appropriate operating system.

The method of this embodiment allows printer 10 to adapt to any print format sent by host 12 by simply receiving the microcode necessary to interpret the new data format. Having an appropriate operating system stored in memory 18, electrical processing circuit 16 can interpret the print job sent from host 12 and transfer the print job to print engine 20 for printing on a print medium (not shown).

In another embodiment, printer 10, rather than host 12, determines the data format associated with the print job, as shown in step S2. A portion of the print data associated with the print job, perhaps approximately ten bytes, is transferred from host computer 12 to buffer memory 14 in printer 10. Printer 10 analyzes the sample of print data to identify the data format being employed. Printer 10 then compares the data format identified in the sample of print data to the operating system stored in memory 18 (step S5). If the data format is incompatible with the stored operating system, printer 10 requests that host computer 12 download the operating system that corresponds to the data format of the sample of print data (step S6).

Although the present invention has been described with reference to preferred embodiments, those skilled in the art will recognize that changes may be made in form and detail without departing from the spirit and scope of the following claims.

What is claimed is:

1. A method of printing on a print medium with a printer which is in communication with a host computer, said method comprising the steps of providing the host computer with a print job to be printed by the printer; identifying a data format associated with said print job; determining an operating system stored in the printer; comparing said data format with said printer operating system; downloading an operating system which corresponds to said data format from the host computer to the printer if said printer operating system does not correspond to said data format; transmitting print data associated with said print job from the host computer to the printer; printing on the print medium with the printer; and further comprising the step of overwriting said printer operating system with said operating system from the host computer.

2. A method of printing on a print medium with a printer which is in communication with a host computer, said method comprising the steps of: providing the host computer with a print job to be printed by the printer; identifying a data format associated with said print job; determining an operating system stored in the printer; comparing said data format with said printer operating system; downloading an operating system which corresponds to said data format from the host computer to the printer if said printer operating system does not correspond to said data format; transmitting print data associated with said print job from the host computer to the printer; printing on the print medium with the printer; and further comprising the step of overwriting said printer operating system with said operating system from the host computer; and further comprising the step of erasing all operating systems stored in the printer that are different from said operating system downloaded from the host computer.

3. A method of printing on a print medium with a printer which is in communication with a host computer, said method comprising the steps of: providing the host computer with a print job to be printed by the printer; identifying a data format associated with said print job; determining an operating system stored in the printer; comparing said data format with said printer operating system; downloading an operating system which corresponds to said data format from the host computer to the printer if said printer operating system does not correspond to said data format; transmitting print data associated with said print job from the host computer to the printer; printing on the print medium with the printer; and further comprising the step of erasing all operating systems stored in the printer that are different from said operating system downloaded from the host computer, wherein said downloading step includes the step of using the printer to request from the host computer said operating system which corresponds to said data format.

* * * * *